Aug. 5, 1952 G. G. HAVENS 2,606,133
MACHINE FOR FORMING STRUCTURAL MATERIAL
Filed May 14, 1951 6 Sheets-Sheet 2

Fig. 2.

INVENTOR.
GLENN G. HAVENS
BY Lyon & Lyon
ATTORNEYS

Aug. 5, 1952     G. G. HAVENS     2,606,133
MACHINE FOR FORMING STRUCTURAL MATERIAL
Filed May 14, 1951     6 Sheets-Sheet 4

INVENTOR.
GLENN G. HAVENS
BY
Lyon & Lyon
ATTORNEYS

Aug. 5, 1952　　　　G. G. HAVENS　　　2,606,133
MACHINE FOR FORMING STRUCTURAL MATERIAL
Filed May 14, 1951　　　　　　　　　　　6 Sheets-Sheet 6

INVENTOR.
GLENN G. HAVENS
BY
Lyon+Lyon
ATTORNEYS

Patented Aug. 5, 1952

2,606,133

UNITED STATES PATENT OFFICE 2,606,133

MACHINE FOR FORMING STRUCTURAL MATERIAL

Glenn George Havens, San Diego, Calif., assignor to Narmco, Inc., San Diego, Calif., a corporation of California Application May 14, 1951, Serial No. 226,269

20 Claims. (Cl. 154—1.8)

This invention relates to a machine for preparing and forming structural materials.

It has been proposed to employ as a light weight structural material for aircraft and other use a sandwich material containing a core bonded in sandwich construction between sheets of suitable light weight material. The present invention is directed to a machine for constructing such core material. The said core preferably consists of a plurality of ribbons of thin material disposed at right angles to the spaced sheets, each or alternate ribbons being in wave formation, the edges of the ribbon being attached to the spaced sheets so as to form a unitary, composite structure. An example of such a material is described in my co-pending application, Serial No. 154,138, filed April 5, 1950.

In order to construct a core composed of a plurality of undulating ribbons, each secured by a suitable adhesive to its next adjacent ribbon, which may be either straight or also undulating as desired, it is necessary to provide means for properly shaping the individual ribbons, locating successive ribbons in proper relative positions, and curing or otherwise treating the structure so as to cause good adherence of the ribbons and a strong integral core. In addition, it is desirable that the operation of the machine be continuous rather than intermittent, that is, that a continual flow of finished core be produced by the machine.

In accordance with the present invention, a machine is provided which efficiently and economically accomplishes these ends.

It is a principal object of the present invention to provide a machine for forming a core for structural material comprising a plurality of undulating ribbons.

It is a further object of this invention to provide such a machine which will operate efficiently and economically.

It is another object of the invention to provide such a machine which may be continuously operated to produce such a core.

It is a more particular object of this invention to provide such a machine whereby straight ribbon elements may be fed to the machine, properly shaped, aligned and treated to effect a more or less continuous formation of the desired core.

It is still another object of this invention to provide such a machine which is flexible in operation regarding size and nature of the constituents of the core material.

Other objects and advantages of this invention may be had from the following description, and the preferred embodiments thereof may be seen in the accompanying drawings, in which.

Referring first to the modification illustrated in Figs. 1 to 7, the machine comprises a frame generally designated by the numeral 17, to which is rigidly secured vertical side panels 19, forming the walls of an oven generally designated by the numeral 20. Vertical side panels 19 also rigidly support an oven bed 21. Numeral 23 designates the top of the oven 20. For purposes which will hereinafter be described, the oven top 23 is movable vertically by means of bolt and spring devices 25.

The oven bed 21 is adapted to receive a plurality of ribbon forming bars 27 on which are mounted spaced pins 29. As will hereinafter be described, the machine illustrated is designed to receive the said forming bars and position and deliver said forming bars onto the oven bed. Simultaneously, the ribbons, which may consist of thin metallic ribbon, resin impregnated glass or other suitable material, are fed to the machine through a suitable ribbon guide in such manner that the ribbons lie between the pins 29 of the forming bars 27. As each forming bar is delivered to the oven bed 21, it will force the preceding forming bars backward into the oven 20, thereby pulling from a suitable feeder, such for example as feed rollers, a length of ribbon material. After a sufficient number of forming bars has been delivered to the oven 20, the placing of additional forming bars therein will force the first introduced forming bars out the back of the oven. At this point, the forming bars are removed from the ribbons.

Prior to their introduction into the machine, each ribbon or alternate ribbons, if desired, are coated with a suitable thermo-setting adhesive. This adhesive will be cured in the oven as the ribbon passes therethrough, with the result that adjacent ribbons will strongly adhere to one another by the time the back end of the oven is reached. Thus, a continuous flow of core material is realized. In order to impart the desired configuration to the core material, such as, for example, as that shown in Figs. 9 and 10, the machine is also adapted to transversely move the forming bars relative to each other prior to their introduction into the oven 20. In the preferred embodiment, the machine is adapted to construct a core material such as that shown in Figs. 9 and 10, wherein straight strips of material are located between undulating strips of material. As will hereinafter be described, this form is accomplished by placing those strips of material to which the undulated form is to be imparted between the pins of the forming bars prior to any transverse movement of the forming bars. The straight through strips, on the other hand, are fed to the machine from a position above the strips to be undulated, with the result that the former are not placed between the pins of the forming bars until after transverse movement thereof has been completed.

Figure 2:
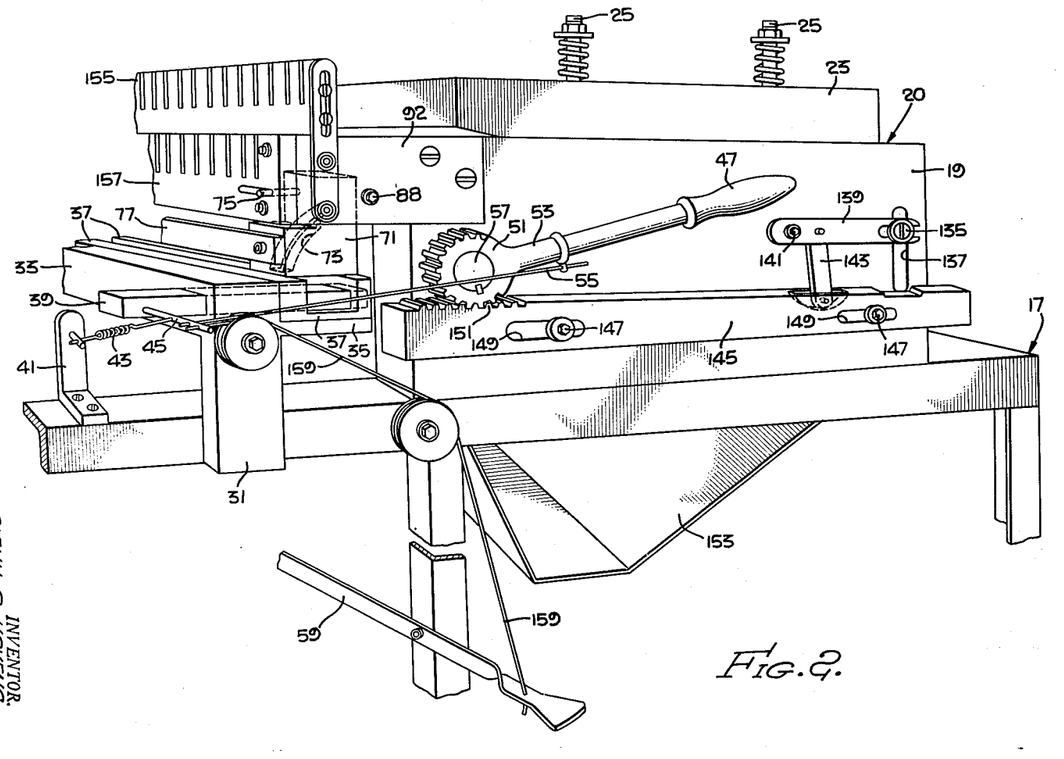
Fig. 2 is a perspective view partially cut away illustrating another aspect of the machine shown in Fig. 1.
Figure 3:
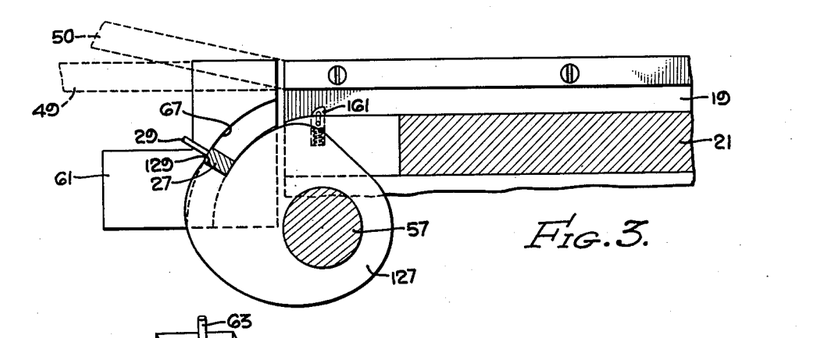
Fig. 3 is a fragmentary section illustrating the bar lifting mechanism of the machine.
Figure 5:
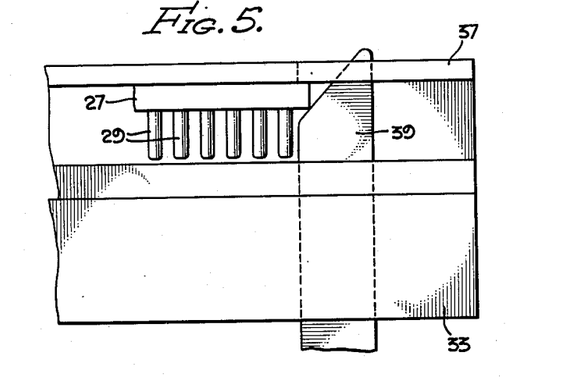
Fig. 5 is a fragmentary view illustrating the forming bar positioning mechanism of the machine.
Figure 6:
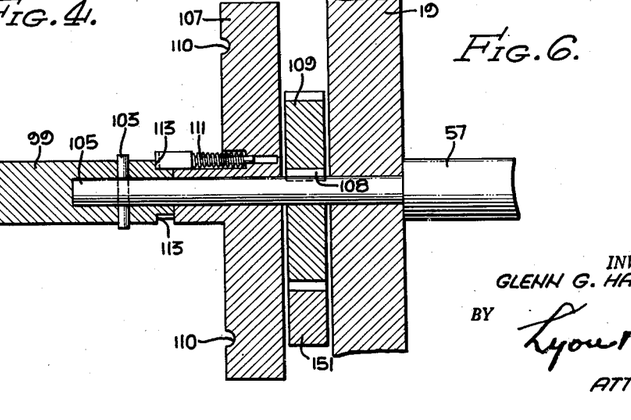
Fig. 6 is a fragmentary cross section illustrating in part the mechanism employed to shift the forming bars in the machine.
Figure 7:
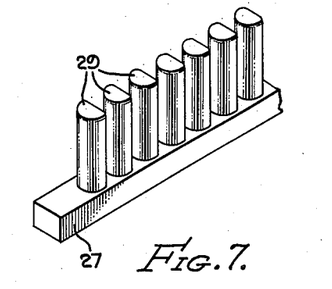
Fig. 7 is a fragmentary perspective view of a forming bar used in the machine.

The manner in which the forming bars are delivered to the machine and positioned in the oven 20 will now be described. Fixedly mounted upon the frame 17 is an L-shaped supporting member 31, illustrated in Fig. 2, the horizontal portion 33 of which extends transversely but a part of the width of the machine. Integral with the supporting member 31 is a shelf 35. Carried by the shelf 35 is a forming bar seating trough 37. As seen in Figs. 2 and 5, a beveled positioning bar 39 extends through the horizontal portion 33 of the supporting member 31 and through the seating trough 37. Attached to a lug 41 is a tension spring 43 secured to a pin 45 which is carried by the beveled positioning bar 39. The spring 43 tends to hold the positioning bar 39 in a retracted position, that is, out of the trough or channel portion of the forming bar seating trough 37. In order to insert the positioning bar 39 in the forming bar seating trough 37, a gear 51 having an extended collar portion 53 to which a cable 55 is attached, is provided. Gear 51 is fixedly mounted upon a shaft 57. A handle 47, attached to the collar portion 53 of the gear 51 rotated clockwise as viewed in Fig. 2, will insert the positioning bar 39 in the forming bar seating trough 37. As will hereinafter become apparent, the complete operation of the machine can be effected simply by manual operation of the handle 47, and such operation has been found convenient, particularly when it is desired to first place the machine in operation or when it is desired to carefully control the operation of the machine to observe its performance. For normal operation of the machine, however, a foot treadle 59 is provided. Attached to such foot treadle is a cable 159 which is attached to pin 45. Depression of the foot treadle 59 will therefore insert the positioning bar 39 in the forming bar seating trough 37. As will hereinafter be described, further depression of the foot treadle 59 will actuate an air ram 89 which in turn will cause rotation of shaft 57 and with it complete operation of the machine.

Figure 1:
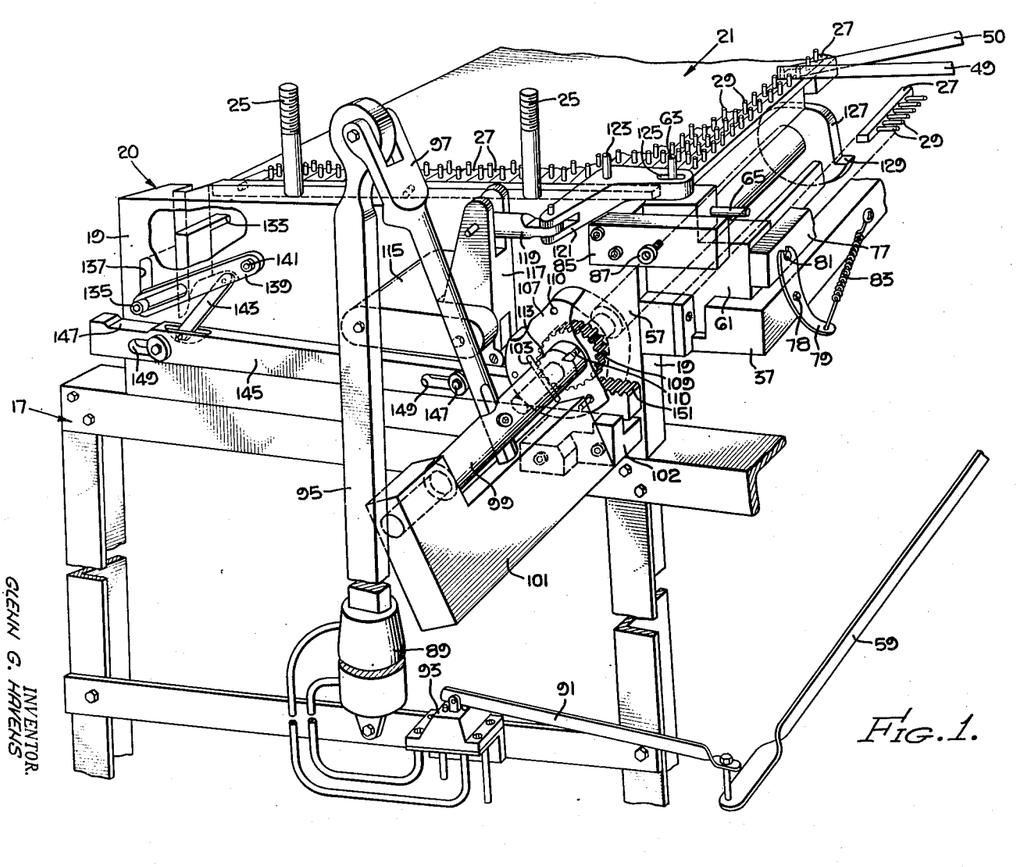
Fig. 1 is a perspective view partially cut away illustrating one form of a machine embodying the present invention.
Figure 4:
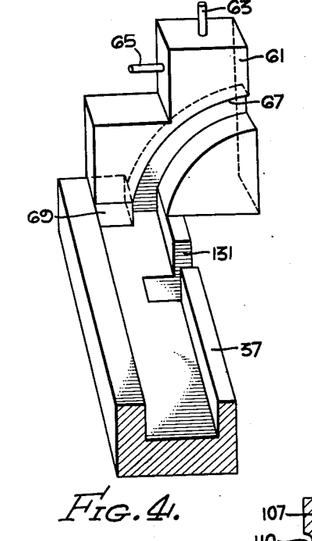
Fig. 4 is a perspective, partially in section, illustrating a further aspect of the lifting mechanism of the machine.

Referring particularly to Figs. 1, 2 and 4, the mechanism for laterally aligning the forming bars will be described. Slideably seated in the forming bar seating trough 37 at one end thereof is a positioning block generally designated as 61, as best seen in Fig. 4. Pins 63 and 65 extend from positioning block 61. In the inner surface of block 61 is disposed an arcuate channel 67 through which the end of a forming bar travels in a manner to be hereinafter described. In the interior of the forming bar seating trough 37 and mounted thereto is a block 69 to aid in properly positioning the positioning block 61. At the other end of the forming bar seating trough 37 is a second positioning block 71 containing a similar arcuate channel 73 in the interior thereof. Horizontal pin 75 extends from the upper portion thereof. The positioning block 71 rides upon the top portion of the forming bar seating trough 37, as seen in Fig. 2. A transverse bar 77 joins and is connected in any suitable manner to positioning blocks 61 and 71. Pivotally mounted at 78 to the forming bar seating trough 37 is a lever 79, into one end of which is journaled a lug 81 which extends from bar 77. The other end of the lever 79 is attached to a tension spring 83 which in turn is attached to the forming bar seating trough 37. As seen in Fig. 1, the lever spring mechanism just described will tend to force the positioning blocks 61 and 71 to the left. In order to provide a stop for the positioning block 61, a bar 85 is mounted upon the vertical side panel 19. A bolt 87 is threaded through the said bar 85 providing an adjustable stop. In like manner, a bolt 88 is threaded through a bar 92 which is bolted to vertical side channel 19 to provide an adjustable stop for the positioning block 71.

In order to laterally position the forming bars 27 prior to their entry into the oven 20, means are provided for transverse displacement of the positioning blocks 61 and 71. Thus, referring to Figs. 1 and 6, there is provided an air ram 89 operable by means of foot treadle 59 to which is connected a lever 91 which operates a valve 93. Integrally connected to the piston of the air ram is a shaft 95, at the upper end of which is connected a link 97. The link 97 in turn extends through and is bolted to a shaft 99 journaled at one end in a supporting bracket 101 which is attached to a block 102, which in turn is carried by the vertical side panels 19. Rigidly connected to the shaft 99 by means of pin 103 is the reduced diameter end portion 105 of shaft 57. Journaled and freely rotatable about the latter shaft is a cam 107. In adjacent spaced relation to cam 107, but fixedly secured to the end portion 105 of shaft 57 by means of a key 108 is a gear 109. As seen, the end portion 105 of shaft 57 is journaled in vertical side panel 19. While the above arrangement has been found preferable for mechanical expediency, a single transverse shaft may be substituted for the shafts 99 and 57, and when reference is hereinafter made to a transverse shaft, such is intended to refer to shafts 99 and 57.

Disposed about the periphery of shaft 99 is a group, preferably four, of equally spaced notches 113, adapted to be engaged by a spring detent 111 which is carried by cam 107. As is apparent from the drawings, when the spring detent 111 engages the notches 113, it will cause rotation of the cam 107 with the shaft 99 in a counterclockwise direction, as viewed in Fig. 1. An additional spring detent 106, carried by supporting bracket 101 is adapted to engage a series of indents 110 to prevent backward rotation of cam 107. Fixedly mounted upon vertical side panel 19 is a bracket 115 to which is pivotally connected a cam follower 117. A link 119 is attached at one end thereof to the said cam follower and at its other end to an elbow 121 which is pivotally mounted to vertical side panel 19 by being journaled in a pin 123. A slot 125 is provided in elbow 121 through which extends pin 63 of positioning block 61. As seen, when shaft 99 is rotated in a counterclockwise direction, cam 107 will be similarly rotated. Cam follower 117 will then pivot elbow 121 about pin 123, with the result that positioning block 61 and also positioning block 71 which is attached thereto by bar 77 will move transversely of the machine.

The means whereby ribbon forming bars 27 are delivered to the oven 20 will now be described. Fixedly mounted on shaft 57 are two or more lifting members 127. The number of such lifting members employed is not critical, although it is preferred that at least two should be employed. As seen, the periphery of each of the lifting members 107 is cut away to provide a lifting shelf 129 thereon for the ribbon forming bars 27. The shape of the remainder of the periphery of the lifting members 127 is not critical, although it is preferred that they be cut away to the general shape shown for economy of space and material. The lifting shelf portions 129 of the lifting members 127 extend into the interior of the forming bar seating trough 37 to lift therefrom forming bars which are placed therein by the operator of the machine. Notches such as 131 shown in Fig. 4 are cut at the appropriate locations in the forming bar seating trough 37 to accommodate the lifting members. As seen, when a ribbon forming bar 27 is placed in the forming bar seating trough 37 and the shaft 99 is rotated in a counterclockwise direction, as viewed in Fig. 1, the lifting shelf 129 of the lifting members 127 will engage and lift the ribbon forming bars 27 upwardly, depositing the same upon the oven bed 21. The diameter of the lifting members 127 is such that the ends of the ribbon forming bars 27 will ride in the arcuate channels 67 and 73 of the positioning blocks 61 and 71, respectively.

In the preferred operation of the machine, ribbons 50, which form the straight through portions of the core material, are coated or impregnated with a thermo-setting adhesive, while ribbons 49, which form the undulating portions of the core material, are uncoated. After the material has passed through the oven 20 and out the rear portion thereof, at which point it is desired to remove the ribbon forming bars 27, the core material may tend to adhere to the ribbon forming bars 27. In order to insure separation of the ribbon forming bars 27 from the core material, ejector fingers 133 are provided, preferably on each side of the machine. Such fingers are unsupported by bolts 135 which are passed through slots 137 in the vertical side panels 19 to permit vertical movement of the fingers 133. Bolts 135 also extend into slotted ends of links 139 which are pivotally connected to the vertical side panels 19 at 141. Attached to links 139 are additional links 143 which in turn are pivotally connected to longitudinal bars or racks 145. Bars 145 are mounted on vertical side panels 19 by means of bolts 147 which pass through slots 149, permitting longitudinal movement thereof. At one end of longitudinal bars 145 are the rack portions 151 thereof, which are meshed with gears 51 and 109. Gear 51 is fixedly mounted on shaft 57 and gear 109 is fixedly mounted on reduced diameter end portion 105 of shaft 57. Accordingly, when shaft 57 is rotated, such rotation will cause bars 145 to move in a longitudinal direction, which in turn will cause fingers 133 to move vertically. Thus, when the operator pushes the foot treadle downwardly, the shaft 57 will be rotated in a counterclockwise direction, as viewed in Fig. 1. This will force the fingers 133 upwardly to a position above the ribbon forming bars 27. At this same time, the ribbon forming bars 27 will be positioned onto the oven bed, forcing the rearmost ribbon forming bar to the discharge point at the rear of the oven 20. When the operator releases the foot treadle 59, thereby reversing the operation of the air ram 89, the shaft 57 will then be rotated in a clockwise direction, forcing the fingers 133 downwardly. The fingers 133 which engage the ends of the bars 27 will force the same downwardly, separating them from the core material. If desired, a retaining bin 153 may be provided into which the ribbon forming bars 27 will fall.

The operation of the machine will now be described. The ribbons are fed to the machine from appropriate rolls, not shown, through ribbon guides 155 and 157, and secured in any suitable fashion to pins 29 of the first ribbon forming bar which is placed on the entrance to the oven 20. Next, a second ribbon forming bar 27 is inserted in the forming bar seating trough 37, after which the foot treadle 59 is pressed downwardly by the operator. This operation, through the cable 159, forces the beveled positioning bar 39 into the forming bar seating trough 37, positioning the end of the ribbon forming bar 27 snugly against the block 61. Downward pressure of the foot treadle actuates air ram 89 so as to lower the shaft 95 and rotating shaft 57 in a counterclockwise direction, as viewed in Fig. 1. Such rotation of shaft 57 causes the lifting members 127 to enter the notches 131 in forming bar seating trough 37, lifting the ribbon forming bar 27 resting therein in an arc of rotation concentric to that of the shaft 57, the ends of the ribbon forming bar 27 riding in the arcuate channels 67 and 73 of blocks 61 and 71, respectively. Blocks 61 and 71 prevent transverse movement of the ribbon forming bar 27. The ribbon forming bars 27 then rests in the position shown in Fig. 3. Simultaneously with the lifting of the ribbon forming bar 27, the spring detent 111 engages one of the notches 113 in the shaft 99, and the cam 107 which has been floating freely on reduced diameter end portion 105 of shaft 57, then rotates with said shaft, The cam follower 117 rides on the cam periphery on the neutral cam radius, seen in Fig. 1, until the ribbon forming bar 27 has been lifted to the position shown in Fig. 3. At this time, the cam follower contacts a cam rise, which through the link 119 and elbow 121, causes a transverse movement from its neutral position to the right, as viewed in Fig. 1, of the blocks 61 and 71, and consequently of the ribbon forming bar 27. The cam 107 is so designed that after the ribbon forming bar 27 has been moved to the desired position, a constant cam radius occurs with the result that for a predetermined period, no further transverse displacement will occur. At this time, the pins 29 of the ribbon forming bar 27 enter between those ribbons 49 which are to become the waved elements of the core, as illustrated in position A in Fig. 9. However, inasmuch as ribbons 50 are fed to the machine from a position above that through which ribbons 49 are fed, the pins 29 have not engaged ribbons 50. Thus, ribbons 49 are fed through ribbon guides 157 and ribbons 50 are fed through ribbon guides 155.

As previously stated, one or both of the ribbons 49 and 50 may be coated with a suitable adhesive before entering the machine in order to provide a bond for the core elements. It has been found preferable, however, to coat only the ribbons 50, leaving ribbons 49 uncoated to prevent undesirable adherence to the pins 29. As seen, the ribbons 49 enter the machine approximately in a horizontal plane, whereas the ribbons 50 enter at an angle which is made sufficient to permit pins 29 to engage ribbons 49 without entangling ribbons 50. Without such angular displacement, such tangling would result inasmuch as corresponding ribbons 49 and 50 are preferably in vertical alignment.

Figure 9:
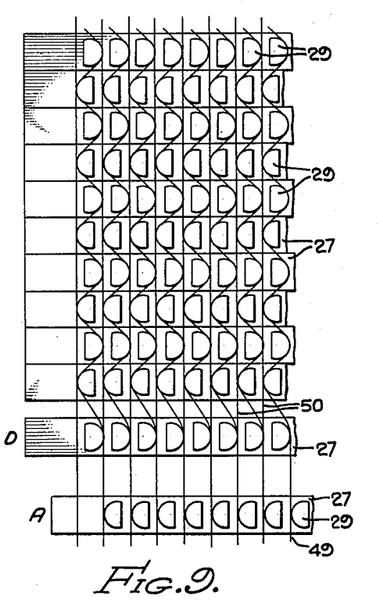
Fig. 9 is a schematic illustrating the operation of the forming bars in the machine.

After a sufficient period for the pins 29 to enter between the strips 49, as shown at position A in Fig. 9, the interval of constant cam radius is followed by a cam fall, at which time the cam follower 117 causes the blocks 61 and 71, and consequently the ribbon forming bar 27, to move laterally to the left, as viewed in Fig. 1, back to the neutral position. Such movement forces the pins 29 against the ribbon 49, bending the same and thereby forming undulations therein, as shown in position B of Fig. 10. At this time, the pins 29 enter between the ribbons 50. Since, however, no further lateral movement of the bar 27 occurs, the ribbons 50 are not bent, but rather form the straight portion of the core structure. As is apparent, the counterclockwise rotation of the shaft 57 above described will cause, through gears 109 and 51 and the rack portion 151 of longitudinal bars 145, a raising of the ejector fingers 133 above any ribbon forming bar 27 emerging from the oven 20.

The rotation of the lifting members 127 continues until the ribbon forming bar is deposited upon the oven bed 21. The bar is held firmly in place on the oven bed by a spring detent 161, illustrated in Fig. 3. In depositing the ribbon forming bars 27 upon the oven bed, the lifting members 127 force each ribbon forming bar 27 against those already on the oven bed 21, thereby forcing a ribbon forming bar 27 from the oven 20 under the ejector fingers 133.

The air ram 89 has now reached its full downward stroke, and the foot treadle is released, actuating the air ram in the opposite direction. This will cause the lifting members 127 to assume their initial position. Simultaneously, the ejector fingers 133 will be forced in a downward direction, thereby pulling ribbon forming bars 27 out of the oven bonded core structure illustrated in Fig. 8, said ribbon forming bars 27 falling into the retaining bin 153 for later use. It should be noted that the cam 107 does not return to its initial position, however, inasmuch as the spring detent 111 releases the cam when the shaft 99 is rotated in a clockwise direction.

Figure 10:
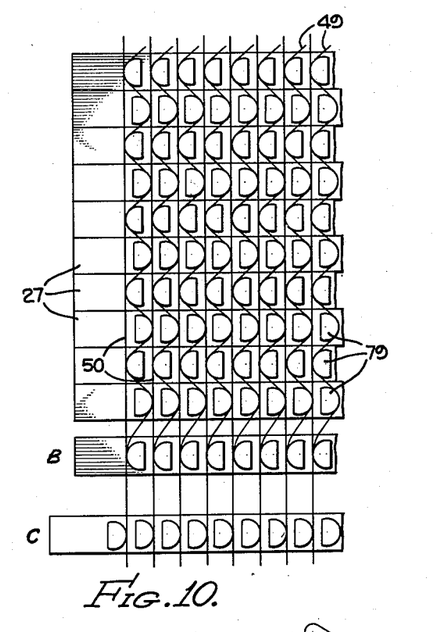
Fig. 10 is a schematic further illustrating the operation of the forming bars in the machine.

The second stage of the operation is essentially the same as the first. However, the ribbon forming bar 27 is placed in the forming bar seating trough 37 in a reverse manner, that is, with the flat sides of the pins 29 facing in the opposite direction, as seen in Figs. 9 and 10. The foot treadle 59 is again depressed, and as before, the ribbon forming bar 27 is lifted by the lifting members 127 to the position shown in Fig. 3. At this time, a cam fall occurs and the tension spring 83 causes the blocks 61 and 71, and with them the ribbon forming bar 27, to shift to the left, as viewed in Fig. 1. Lifting members 127 then cause the pins 29 to enter between the ribbons 49 in position C of Fig. 10. Ribbons 50 are, of course, just above the pins 29 at this stage in the operation. At this point, the cam rise occurs, causing the assembly to shift the ribbon forming bar 27 back to the right, bending ribbons 49, as shown in position D of Fig. 9. The remainder of the operation is identical with that previously described. By repeating the above described operations, a continuous core structure may be made. As is apparent, the length of the core structure is limited only by the lengths of the ribbons 49 and 50, with the result that by continuously feeding such ribbons to the machine, a structure is formed continuously by the machine. The core structure may be removed from the machine in convenient lengths.

To insure core material of uniform height, spring bolts 25 are provided. By proper regulation of these bolts, a slight amount of pressure can be exerted by the oven top 23 upon the core material as it is fed to the machine, thereby insuring a regular and uniform product.

In Figs. 11 to 14, there is shown a modified form of the invention. The principal difference in this form of the invention from that heretofore described is that rather than employing transversely moving ribbon forming bars 27 to form the desired undulations of the ribbons of the core material, such ribbon forming bars 27 are fixed insofar as transverse movement is concerned. The desired undulations are formed by employing a transversely movable ribbon guide, such guide being controlled by a mechanism substantially the same as that heretofore described for controlling the movement of the blocks 61 and 71 together with the ribbon forming bars 27.

Figures 12, 13:
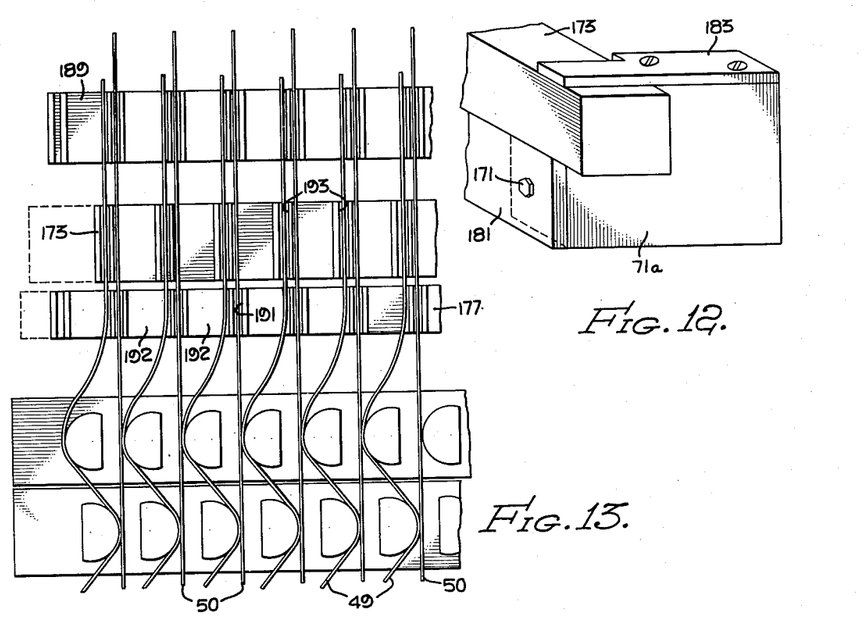
Fig. 12 is a fragmentary perspective view illustrating the mounting of the ribbon feed mechanism for the machine illustrated in Fig. 11.
Fig. 13 is a schematic illustrating the operation of the feed mechanism and forming bars in the modified form of the invention illustrated in Fig. 11.

Referring to Fig. 12, only those portions of the machine which differ from those heretofore described are illustrated. For convenience of illustration and understanding, like numerals will be employed for like parts in the two embodiments. Thus, secured to the frame 17a is a supporting bracket 101a, within which is journaled a shaft 99a. Secured to shaft 99a, as before, is shaft 57a, not shown, on which is fixedly mounted gear 109a. Gear 109a meshes with a longitudinal bar rack 145a, as before, said bar being employed to control the ejector fingers 133, not shown. Rotatably mounted on shaft 99a is a cam 107a. The cam follower 117a is pivotally carried by a bracket 115a which is secured to vertical side panel 19a.

A link 119a is connected at one end thereof to cam follower 117a and at its other end to elbow 121a. Elbow 121a is journaled about a pin 123a, extending from the vertical side panel 19a. Also, pivotally mounted upon pin 123a is a rocker arm 163. At the central portion of rocker arm 163 is a slot 165 through which is extended a bolt 167 threaded into elbow 121a. Set screws 169 are provided to permit ready angular adjustment of the rocker arm 163. A forming bar seating trough 37a is carried by the frame, as before. In the embodiment of the invention now being described, positioning blocks 61a and 71a (not shown) are stationary, being fixed to the vertical side panels 19a as by bolts 171. Slidably carried on blocks 61a is a shifting feeder guide 173. Disposed adjacent to the shifting feeder guide 173 is a floating feeder 177. Floating feeder 177 is supported merely by resting upon ribbons 49 and 50, and is therefore preferably constructed of light weight material.

Figure 11:
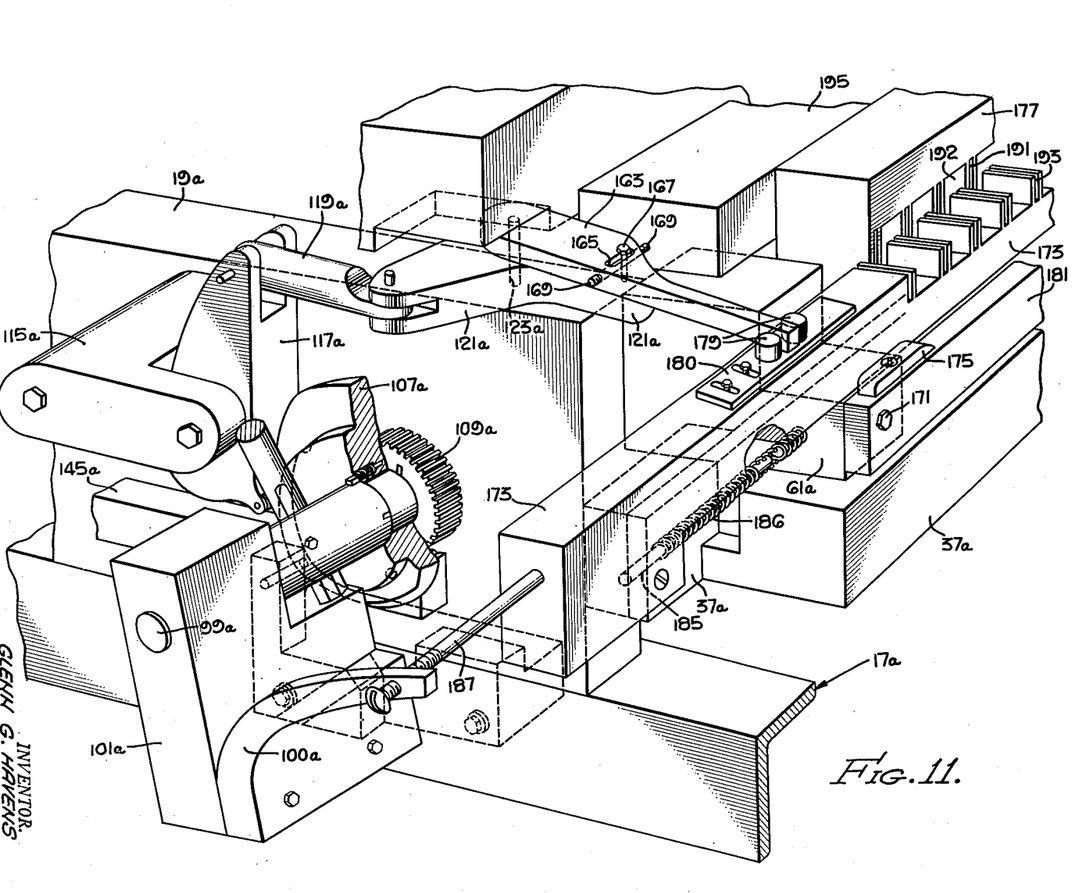
Fig. 11 is a perspective view partially cut away illustrating, on a somewhat enlarged scale, a modified form of the invention.

The narrow end of rocker arm 163 is disposed between and in sliding contact with pins 179 of a stroke bracket 180 which is adjustably secured to the shifting feeder guide 173 by bolts, as shown. By loosening these bolts and sliding the stroke bracket 180 inwardly or outwardly, the length of stroke of the rocker arm 163 can be adjusted. As seen, when the cam 107a is rotated, the shifting feeder guide 173 will be shifted from its neutral position to the right or left, depending upon the location of the cam follower 117a on the cam 107a, in sliding contact with the positioning blocks 61a and 71a. The shifting feeder guide 173 is restrained against movement longitudinally of the machine by lugs such as 175 which are fixed to a transverse bar 181, which bar is secured to positioning blocks 61a and 71a, as seen in Figs. 11 and 12. In addition, a bracket 183 is provided to maintain guide 173 in proper position.

Fixed to shifting feeder guide 173 at one end thereof is a pin 185 about which is placed a compression spring 186 which bears against positioning block 61a tending to maintain shifting feeder guide 173 in its neutral position, as viewed in Fig. 11, against adjustable stop 187 which is secured to a bent support plate 189a which in turn is bolted to a supporting bracket 191a. The movement of rocker arm 163 as above described, forces shifting feeder guide 173 to the right against the force of compression spring 186.

Figure 14:
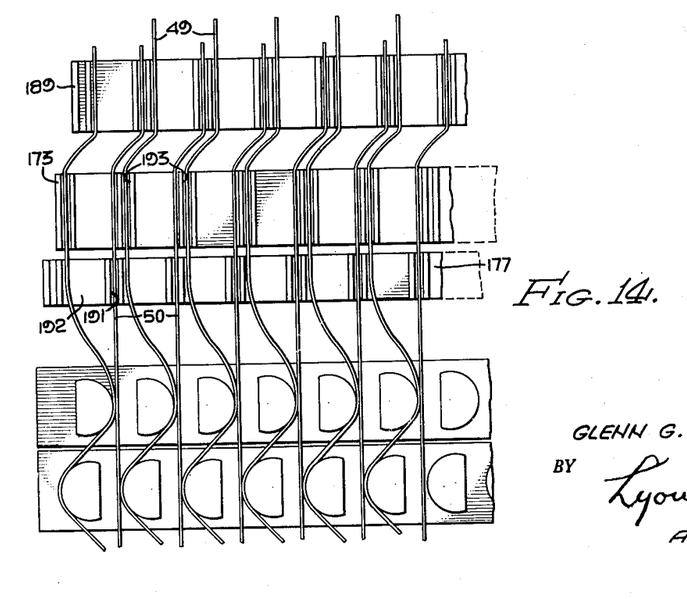
Fig. 14 is a schematic further illustrating the operation of the feed mechanism and forming bars in the modified form of the invention illustrated in Fig. 11.

Referring to Figs. 13 and 14, the formation of the undulations in alternate ribbons by the modified form of the machine will now be described. As seen, the straight through ribbons 50 are threaded in the guides 191 of floating feeder guide 177, the undulating ribbons 49 being located in the spaces 192 between such guides. In like manner, undulating ribbons 49 are placed in the guides 193 of shifting feeder guide 173, while the straight through ribbons pass between the spaces between such guides. The ribbons are fed to guides 173 and floating feeder guide 177 from a stationary guide 189. In Fig. 13, shifting feeder guide 173 is in the position to the left as viewed in Fig. 11. As the cam follower 117a passes over a cam rise, the shifting feeder guide 173 will be forced to the right, as viewed in Fig. 11, or the position shown in Fig. 14. This operation will force the ribbons 49 against the guides 191 of floating feeder guide 177, moving the floating feeder guide 177 slightly to the left relative to stationary guide 189, as seen in Fig. 14. The pins 29 of each ribbon forming bar 27 enter between the ribbons between the oven bed and the floating feeder guide. Successive forming bars are reversed in direction, as before. As seen in Figs. 13 and 14, the back and forth transverse movement of the shifting feeder guide will cause ribbons 49 to follow the rounded portions of pins 29 of successive forming bars. As these forming bars are lifted onto the oven bed, the desired undulations will be formed in the ribbons. On the other hand, since ribbons 50 are located between the guides of the shifting feeder guide 173, but in the guides of the floating feeder guide 177, each such ribbon will be distributed as shown, with no undulations formed therein.

Figure 8:
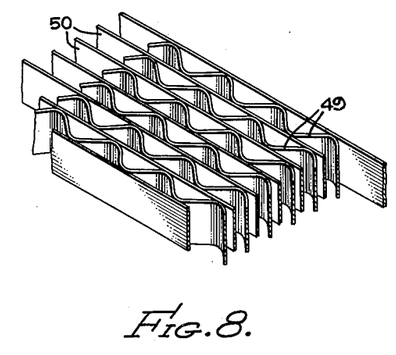
Fig. 8 is a fragmentary perspective view illustrating one form of core material constructed in accordance with the present invention.

As before, thermo-setting adhesive, preferably applied only to ribbons 50, will cause adjacent ribbons to strongly adhere to each other after curing in the oven, resulting in a strong core material such as shown in Fig. 8.

A weight 195 is positioned to rest upon the top edges of the ribbon elements, keeping them at an even height as they enter the oven.

In order to prevent premature adhesion of adjacent ribbons 49 and 50, the floating feeder guide 177 is provided. The floating feeder guide 177, moreover, functions to position ribbons 50 and to move adhesive coated ribbons 50 away from the guides 193 of shifting feeder guide 173, preventing adherence thereto.

The operation of the embodiment of the device shown in Figs. 11 to 14 is substantially the same as the previous embodiment of the invention described therein, and need not therefore be described in full detail. The principal difference between the two embodiments is the manner in which the undulations are formed in the ribbons 49, such undulations being formed by the first described embodiment by transverse movement of the ribbon forming bars 27 and in the second embodiment by transverse movement of the shifting feeder guide 173. In addition, in the second embodiment, the ribbons 49 and 50 may be fed to the machine without vertical displacement of one relative to the other, whereas in the first embodiment of the machine described the ribbons 50 must be vertically displaced from the ribbons 49 in order to prevent undulations being formed in the ribbons 50.

While there has been described what is at present the preferred embodiments of the invention, it will be understood that various changes and alterations may be made therein without departing from the invention, and it is intended to cover herein all such changes and alterations as come within the true scope and spirit of the annexed claims.

I claim:

1. In a machine of the class described, an oven bed, a seating trough adjacent thereto, forming bars adapted to be placed in said seating trough, lifting members adapted to lift said forming bars from said seating trough and onto said oven bed, a ribbon feeder guide adapted to receive and guide a plurality of ribbons over said oven bed, and means operatively connected for effecting relative motion between said forming bars and said ribbon feeder guide whereby undulations are formed in said ribbons.

2. In a machine of the class described, an oven bed, a seating trough adjacent thereto, forming bars adapted to be placed in said seating trough, lifting members adapted to lift said forming bars from said seating trough and onto said oven bed, a ribbon feeder guide adapted to receive and guide a plurality of ribbons over said oven bed, a transverse shaft, a cam carried by said shaft, a cam follower, and means operatively connected to said cam follower for effecting relative motion between said forming bars and said ribbon feeder guide whereby undulations are formed in said ribbons.

3. In a machine of the class described, an oven bed, a seating trough adjacent thereto, a plurality of forming bars adapted to be placed in said seating trough, pins mounted on said forming bars, a transverse shaft, lifting members carried by said shaft and adapted to enter said seating trough and to lift said forming bars from said seating trough and onto said oven bed as said shaft rotates, a ribbon feeder guide adapted to receive and guide a plurality of ribbons between said pins on said forming bars, means operatively connected to said shaft for effecting relative motion between said forming bars and said ribbon feeder guide as said shaft rotates, whereby undulations are formed in said ribbons.

4. In a machine of the class described, an oven bed, a seating trough adjacent thereto, a plurality of forming bars adapted to be placed in said seating trough, pins mounted on said forming bars, a transverse shaft, lifting members carried by said shaft and adapted to enter said seating trough and to lift said forming bars from said seating trough and onto said oven bed as said shaft rotates, a ribbon feeder guide adapted to receive and guide a plurality of ribbons between said pins on said forming bars, a cam carried by said shaft, a cam follower and means operatively connected to said cam follower for effecting relative motion between said forming bars and said ribbon feeder guide whereby undulations are formed in said ribbons.

5. In a machine of the class described, an oven bed, a seating trough adjacent one end thereof, a plurality of forming bars adapted to be placed in said seating trough, pins mounted on said forming bars, lifting members adapted to lift said forming bars from said seating trough and onto said one end of said oven bed, a ribbon feeder guide adapted to receive and guide a plurality of ribbons between said pins on said forming bars, a shaft, means operatively connected to said shaft for effecting relative motion between said forming bars and said ribbon feeder guide as said shaft is rotated, whereby undulations are formed in said ribbons, a gear carried by said shaft, a longitudinal rack meshed with said gear, forming bar ejectors and means connecting said forming bar ejectors to said rack for effecting vertical movement of said forming bar ejectors as said shaft rotates.

6. In a machine of the class described, an oven bed, a seating trough adjacent thereto, a plurality of forming bars adapted to be placed in said seating trough, pins mounted on said forming bars, a ribbon feeder guide adapted to receive and guide a plurality of ribbons to said oven bed, a transverse shaft, lifting members carried by said shaft and adapted to enter said seating trough and to lift said forming bars from said seating trough and onto said oven bed as said shaft rotates, the pins of each said forming bar entering the space between adjacent ribbons as said forming bar is so lifted, and means operatively connected for effecting relative motion between said forming bars and said ribbon feeder guide as said forming bars are raised onto said oven bed whereby undulations are formed in said ribbons.

7. In a machine of the class described, an oven bed, a seating trough adjacent one end thereof, a plurality of forming bars adapted to be placed in said seating trough, pins mounted on said forming bars, a ribbon feeder guide adapted to receive and guide a plurality of ribbons to said oven bed, a transverse shaft, lifting members carried by said shaft and adapted to enter said seating trough and to lift said forming bars from said seating trough and onto said oven bed as said shaft rotates, the pins of each said forming bar entering the space between adjacent ribbons as said forming bar is so lifted, a cam carried by said shaft, a cam follower, and means operatively connected to said cam follower for effecting relative motion between said forming bars and said ribbon feeder guide, whereby undulations are formed in said ribbons.

8. In a machine of the class described, an oven bed, a seating trough adjacent one end thereof, a plurality of forming bars adapted to be placed in said seating trough, pins mounted on said forming bars, a ribbon feeder guide adapted to receive and guide a plurality of ribbons to said oven bed, a transverse shaft, lifting members carried by said shaft and adapted to enter said seating trough and to lift said forming bars from said seating trough and onto said oven bed as said shaft rotates, the pins of each said forming bar entering the space between adjacent ribbons as said forming bar is so lifted, a cam carried by said shaft, a cam follower, means operatively connected to said cam follower for effecting relative motion between said forming bars and said ribbon feeder guide whereby undulations are formed in said ribbons, a gear carried by said shaft, a longitudinal rack meshed with said gear, forming bar ejectors and means connecting said forming bar ejectors to said rack for effecting vertical movement of said forming bar ejectors as said shaft rotates.

9. In a machine of the class described, an oven bed, a seating trough adjacent thereto, a plurality of forming bars adapted to be placed in said seating trough, pins mounted on said forming bars, a transverse shaft, lifting members carried by said shaft and adapted to enter said seating trough and to lift said forming bars from said seating trough and onto said oven bed as said shaft rotates, a ribbon feeder guide adapted to receive and guide a plurality of ribbons between said pins on said forming bars, means operatively connected to said shaft for effecting a transverse motion of said forming bars whereby undulations are formed in said ribbons.

10. In a machine of the class described, an oven bed, a seating trough adjacent thereto, a plurality of forming bars adapted to be placed in said seating trough, pins mounted on said forming bars, a transverse shaft, lifting members carried by said shaft and adapted to enter said seating trough and to lift said forming bars from said seating trough and onto said oven bed as said shaft rotates, a ribbon feeder guide adapted to receive and guide a plurality of ribbons between said pins on said forming bars, a cam carried by said shaft, a cam follower and linking means operatively connecting said cam follower for effecting transverse motion of said forming bars whereby undulations are formed in said ribbons.

11. In a machine of the class described, an oven bed, a seating trough adjacent thereto, a plurality of forming bars adapted to be placed in said seating trough, pins mounted on said forming bars, a positioning block at one end of said seating trough, a second positioning block at the other end of said seating trough, lifting members adapted to lift said forming bars from said seating trough and onto said oven bed, a ribbon feeder guide adapted to receive and guide a plurality of ribbons between said pins of said forming bars, a shaft, a cam carried by said shaft, a cam follower, a linking mechanism between said cam follower and one of said positioning blocks for effecting transverse motion of said forming bars as said shaft rotates, whereby undulations are formed in said ribbons.

12. In a machine of the class described, an oven bed, a seating trough adjacent one end thereof, a plurality of forming bars adapted to be placed in said seating trough, pins mounted on said forming bars, a positioning block at one end of said seating trough, a second positioning block at the other end of said seating trough, lifting members adapted to lift said forming bars from said seating trough and onto said oven bed, a ribbon feeder guide adapted to receive and guide a plurality of ribbons between said pins of said forming bars, means operatively connected to one of said positioning blocks for effecting transverse motion of said forming bars whereby undulations are formed in said ribbons, a shaft, a gear carried by said shaft, a longitudinal rack meshed with said gear, forming bar ejectors and means connecting said forming bar ejectors to said rack for effecting vertical movement of said forming bar ejectors as said shaft rotates.

13. In a machine of the class described, an oven bed, a seating trough adjacent thereto, a plurality of forming bars adapted to be placed in said seating trough, pins mounted on said forming bars, a positioning block at one end of said seating trough, a second positioning block at the other end of said seating trough, a transverse shaft, lifting members carried by said shaft and adapted to enter said seating trough and to lift said forming bars from said seating trough and onto said oven bed as said shaft rotates, a ribbon feeder guide adapted to receive and guide a plurality of ribbons between said pins of said forming bars, a cam carried by said shaft, a cam follower, a linking mechanism between said cam follower and one of said positioning blocks for effecting transverse motion of said forming bars as said shaft rotates whereby undulations are formed in said ribbons, a gear carried by said shaft, a longitudinal rack meshed with said gear, forming bar ejectors and means connecting said forming bar ejectors to said rack for effecting vertical movement of said forming bar ejectors as said shaft rotates.

14. In a machine of the class described, an oven bed, a seating trough adjacent thereto, a plurality of forming bars adapted to be placed in said seating trough, pins mounted on said forming bars, lifting members adapted to enter said seating trough to lift said forming bars from said seating trough and onto said oven bed as said shaft rotates, a transverse shaft, means operatively connected to said shaft for effecting a transverse movement of each of said forming bars as said forming bar is lifted from said seating trough onto said oven bed, a ribbon feeder guide adapted to receive and guide a plurality of ribbons between said pins on each said forming bar before said forming bar has been transversely moved, a second ribbon feeder guide located above the first mentioned ribbon feeder guide and adapted to receive and guide a second plurality of ribbons between said pins on each said forming bars after each said bar has been so transversely moved.

15. In a machine of the class described, an oven bed, a seating trough adjacent thereto, a plurality of forming bars adapted to be placed in said seating trough, pins mounted on said forming bars, a transverse shaft, lifting members carried by said shaft and adapted to enter said seating trough and to lift said forming bars from said seating trough and onto said oven bed as said shaft rotates, a cam carried by said shaft, a cam follower and linking means operatively connected to said cam follower for effecting transverse motion of each said forming bar, a ribbon feeder guide adapted to receive and guide a plurality of ribbons between said pins on each said forming bar before said forming bar has been transversely moved, a second ribbon feeder guide located above the first mentioned ribbon feeder guide and adapted to receive and guide a second plurality of ribbons between said pins on each said forming bars after each said bar has been so transversely moved.

16. In a machine of the class described, an oven bed, a seating trough adjacent one end thereof, a plurality of forming bars adapted to be placed in said seating trough, pins mounted on said forming bars, lifting members adapted to lift said forming bars from said seating trough and onto said oven bed, a ribbon feeder guide slidably mounted on said seating trough, guide members integral with said ribbon feeder guide, a second ribbon feeder guide located adjacent said first mentioned ribbon feeder guide, additional guide members integral with said second ribbon feeder guide, and means for effecting transverse motion of the first mentioned ribbon feeder guide.

17. In a machine of the class described, an oven bed, a seating trough adjacent one end thereof, a plurality of forming bars adapted to be placed in said seating trough, pins mounted on said forming bars, a transverse shaft, lifting members carried by said shaft and adapted to enter said seating trough and to lift said forming bars from said seating trough and onto said oven bed as said shaft rotates, a ribbon feeder guide slidably mounted on said seating trough, guide members integral with said ribbon feeder guide, a second ribbon feeder guide located adjacent said first mentioned ribbon feeder guide, additional guide members integral with said second ribbon feeder guide, a cam carried by said shaft, a cam follower and linking means operatively connected to said cam follower for effecting transverse motion of said first mentioned ribbon feeder guide as said shaft rotates.

18. In a machine of the class described, an oven bed, a seating trough adjacent thereto, a plurality of forming bars adapted to be placed in said seating trough, pins mounted on said forming bars, a transverse shaft, lifting members carried by said shaft and adapted to enter said seating trough and to lift said forming bars from said seating trough and onto said oven bed as said shaft rotates, a ribbon feeder guide slidably mounted on said seating trough, guide members integral with said ribbon feeder guide, a second ribbon feeder guide located adjacent said first mentioned ribbon feeder guide, additional guide members integral with said second ribbon feeder guide, a plurality of ribbons disposed within the guide members of said first mentioned ribbon feeder guide and between the guide members of said second mentioned ribbon feeder guide, a second plurality of ribbons disposed between the guide members of said first mentioned ribbon feeder guide and within the guide members of said second mentioned ribbon feeder guide, the pins of each of said forming bars being located between the individual ribbons of each said plurality of ribbons as the said forming bar is lifted onto said oven bed, and means for effecting transverse motion of said first mentioned ribbon feeder guide whereby undulations are formed in said first mentioned plurality of ribbons by the pins of each said forming bar as the forming bar is lifted onto said oven bed.

19. In a machine of the class described, an oven bed, a seating trough adjacent thereto, a plurality of forming bars adapted to be placed in said seating trough, pins mounted on said forming bars, a transverse shaft, lifting members carried by said shaft and adapted to enter said seating trough and to lift said forming bars from said seating trough and onto said oven bed as said shaft rotates, a ribbon feeder guide slidably mounted on said seating trough, guide members integral with said ribbon feeder guide, a second ribbon feeder guide located adjacent said first mentioned ribbon feeder guide, additional guide members integral with said second ribbon feeder guide, a plurality of ribbons disposed within the guide members of said first mentioned ribbon feeder guide and between the guide members of said second mentioned ribbon feeder guide, a second plurality of ribbons disposed between the guide members of said first mentioned ribbon feeder guide and within the guide members of said second mentioned ribbon feeder guide, the pins of each of said forming bars being located between the individual ribbons of each said plurality of ribbons as the said forming bar is lifted onto said oven bed, a cam carried by said shaft, a cam follower and linking means operatively connected to said cam follower for effecting transverse motion of said first mentioned ribbon feeder guide as said shaft rotates, whereby undulations are formed in said first mentioned plurality of ribbons by the pins of each said forming bar as the forming bar is lifted onto said oven bed.

20. In a machine of the class described, an oven bed, a seating trough adjacent thereto, a plurality of forming bars adapted to be placed in said seating trough, pins mounted on said forming bars, a transverse shaft, lifting members carried by said shaft and adapted to enter said seating trough and to lift said forming bars from said seating trough and onto said oven bed as said shaft rotates, a ribbon feeder guide slidably mounted on said seating trough, guide members integral with said ribbon feeder guide, a second ribbon feeder guide located adjacent said first mentioned ribbon feeder guide, additional guide members integral with said second ribbon feeder guide, a plurality of ribbons disposed within the guide members of said first mentioned ribbon feeder guide and between the guide members of said second mentioned ribbon feeder guide, a second plurality of ribbons disposed between the guide members of said first mentioned ribbon feeder guide and within the guide members of said second mentioned ribbon feeder guide, the pins of each of said forming bars being located between the individual ribbons of each said plurality of ribbons as the said forming bar is lifted onto said oven bed, a cam carried by said shaft, a cam follower and linking means operatively connected to said cam follower for effecting transverse motion of said first mentioned ribbon feeder guide as said shaft rotates, whereby undulations are formed in said first mentioned plurality of ribbons by the pins of each said forming bar as the forming bar is lifted onto said oven bed, a gear carried by said shaft, a longitudinal rack meshed with said gear, forming bar ejectors and means connecting said forming bar ejectors to said rack for effecting vertical movement of said forming bar ejectors as said shaft rotates.

GLENN GEORGE HAVENS.

No references cited.